3,801,711
PHARMACEUTICAL COMPOSITIONS OF QUINOX-
ALINE-DI-N-OXIDES
Florin Seng, Cologne-Buchheim, Kurt Ley, Odenthal-
Gloebusch, and Karl Georg Metzger, Wuppertal-Elber-
feld, Germany, assignors to Bayer Aktiengesellschaft,
Leverkusen, Germany
No Drawing. Original application Nov. 28, 1969, Ser. No.
880,968, now Patent No. 3,682,906. Divided and this
application Sept. 16, 1971, Ser. No. 181,245
Claims priority, application Germany, Dec. 11, 1968,
P 18 13 918.9
Int. Cl. A61k 27/00
U.S. Cl. 424—248                             24 Claims

ABSTRACT OF THE DISCLOSURE

Certain 2-hydroxymethyl-3-carboxylic acid amidoquin-oxaline-di-N-oxides(1,4) are provided having antibacterial activity against both gram-negative and gram-positive organisms. The compounds are useful also in animal feeds and drinking water and are made by reacting the corresponding lactone with ammonia or an amine in a diluent at 0° to 80° C.

---

This is a division of application Ser. No. 880,968 filed Nov. 28, 1969, now U.S. Pat. No. 3,682,906.

The present invention relates to certain new 2-hydroxymethyl-3-carboxylic acid amidoquinoxaline-di-N-oxides-(1,4), to a process for their production and to their formulation and use in human and veterinary medicine and as feedstuff additives in raising young animals or fatstock.

The compounds of the present invention are 2-hydroxymethyl-3-carboxylic acid amidoquinoxaline-di-N-oxides-(1,4) of the formula:

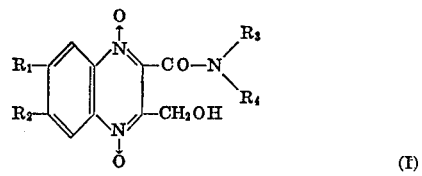

(I)

wherein
$R_1$ and $R_2$ are identical or different and are each hydrogen, lower alkyl or chlorine, and
$R_3$ and $R_4$ are identical or different and are each hydrogen or an unsubstituted or substituted aliphatic radical, provided that when either $R_3$ or $R_4$ is hydrogen the other can be OH or $NH_2$.

The invention further provides a process for the production of such a compound I which comprises reacting a lactone of the formula:

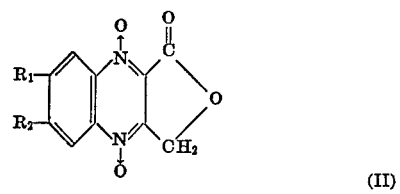

(II)

in which $R_1$ and $R_2$ have the above meaning, with an amine of the formula:

(III)

in which $R_3$ and $R_4$ have the above meaning, in a diluent in the temperature range of 0° to 80° C.

When $R_1$ and/or $R_2$ are lower alkyl, they are preferably methyl, ethyl, n-propyl or isopropyl.

When $R_3$ and/or $R_4$ are unsubstituted or substituted aliphatic radicals, they are preferably straight-chain or branched alkyl or alkylene radicals with up to 18 carbon atoms (most preferably 1 to 4 carbon atoms) and optionally contain a double bond, any substituents in the aliphatic radicals being preferably hydroxyl, alkoxy of 1 to 4 carbon atoms, CN, COO-alkyl wherein alkyl has 1 to 4 carbon atoms, halogen (preferably chlorine), or a phenyl radical in the $\alpha$, $\beta$ or $\omega$-position. Other suitable aliphatic radicals include cycloaliphatic radicals with 5 or preferably 6 carbon atoms in the ring system, and these may also be similarly substituted.

When $R_3$ and/or $R_4$ are alkyl they can, together with the nitrogen atom, form part of a 5-, 6- or 7-membered heterocyclic ring system which in the case of the 6-membered ring may be in p-position to the nitrogen and may carry oxygen or sulphur as further hetero-atoms, as well as an N-alkyl group having 1 to 4 carbon atoms in the alkyl part.

In specially preferred compounds, $R_1$ and $R_2$ are both hydrogen, while $R_3$ and $R_4$, which may be the same or different, are hydrogen, methyl, n- or isopropyl, $\beta$-hydroxyethyl, $\beta$-methoxyethyl, alkyl-OH (hydroxyalkyl) or $-NH_2$ (alkylamine). Alternatively, $R_1$, $R_2$ and $R_3$ can all be hydrogen, while $R_4$ is any one of the radicals just mentioned.

Illustrative amines of Formula III are, without limitation thereto, ammonia, methylamine, ethylamine, propylamine, isopropylamine, butylamine, isobutylamine, tert.-butylamine, stearylamine, ethanolamine, 2-hydroxypropylamine, 3-hydroxypropylamine, 2-methoxyethylamine, cyclohexylamine, 4-methyl-cyclohexylamine, benzylamine, allylamine, dimethylamine, pyrrolidine, hexamethyleneimine, morpholine, thiomorpholine, hydroxylamine and hydrazine.

At least 1 mol of amine is generally employed per mol of lactone. It is possible, but not usually necessary, to use an excess of amine. The reaction is carried out in the temperature range of about 0° to about 80° C., preferably at about 20° to 40° C.

The diluent can be either a polar or a non-polar solvent such as water, alcohols of 1 to 4 carbon atoms, dimethylformamide, dioxan, tetrahydrofuran, dialkyl ethers of 1 to 4 carbon atoms, benzene, toluene or benzene mixtures.

By way of example, the reaction with morpholine may be represented by the following reaction scheme:

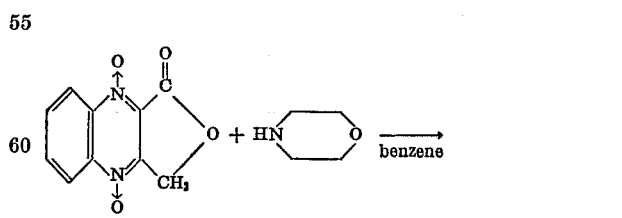

(IV)

In general, the lactone is suspended in a diluent and mixed with at least the equivalent amount of a primary or secondary amine or with ammonia. The reaction is weakly exothermic and after a short time the 2-hydroxymethyl-3-carbonamidoquinoxaline-di-N-oxides(1,4) separate out as crystals. When dimethylformamide is used as the solvent, the reaction products are frequently in solution. In this case the resulting solution can be evaporated in vacuo or mixed with ether, whereupon the 2-hydroxymethyl-3-carbonamidoquinoxaline-di-N-oxide may separate out as crystals.

The invention is illustrated by the following non-limitative examples.

EXAMPLE 1

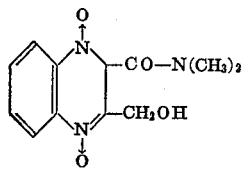

(1)

21.8 g. (0.1 mol) of 1-oxo-1,3-dihydro-furo[3,4-b]quinoxaline-4,9-dioxide are suspended in 100 ml of dimethyl-formamide and mixed with 12 g. of 40–50% strength aqueous dimethylamine solution. The temperature rises to about 30° C. and a brown solution is produced. After 15 minutes 200 ml. of ether are added and 24 g. (91.2% of theory) of 2-hydroxy-methyl-3-N,N-dimethyl-carboxylic acid amidoquinoxaline-di - N - oxide (1,4) are obtained as pale yellow crystals which after recrystallization from alcohol melt at 169° to 172° C. with decomposition.

*Analysis.*—$C_{12}H_{13}N_3O_4$ (molecular weight 263): Calculated: C, 54.6%; H, 4.9%; N, 16.0%. Found: C, 54.7%; H, 4.6%; N, 16.0%.

EXAMPLE 2

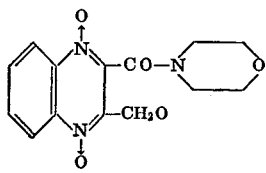

(2)

21.8 g. (0.1 mol) of 1-oxo-1,3-dihydro-furo[3,4-b]quinoxaline-4,9-dioxide are suspended in 200 ml. of benzene and 17.4 g. (0.2 mol) of morpholine are added dropwise. A thick whitish yellow sludge is produced. After 10 hours the product is filtered off and rinsed with benzene.

28 g. (91.7% of theory) of 2-hydroxymethyl-3-morpholino-carbonyl-quinoxaline-di-N-oxide are obtained as pale yellow crystals which, after recrystallization from acetonitrile, melt at 210–212° C. with decomposition.

*Analysis.*—$C_{14}H_{15}N_3O_5$ (molecular weight 305): Calculated: C, 55.1%; H, 4.9%; N, 13.8%. Found: C, 55.3%; H, 5.2%; N, 13.8%.

The following compounds are made by analogous methods.

| Compound | Color | Melting point, °C. |
|---|---|---|
| (3) 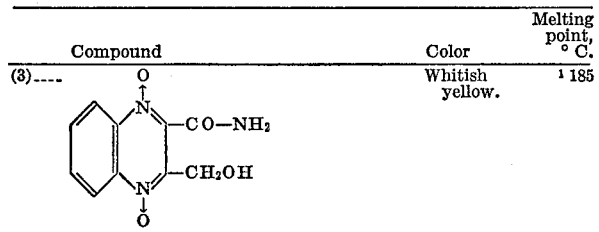 | Whitish yellow. | [1] 185 |
| (4) 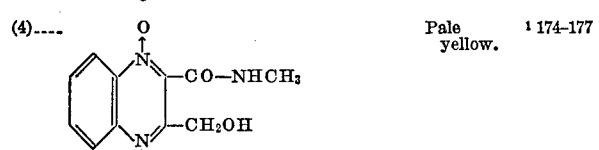 | Pale yellow. | [1] 174–177 |
| (5) O↑N—CO—NH—C₂H₅ / —CH₂OH / N↓O | Pale yellow. | [1] 179–181 |
| (6) O↑N—CO—NH—C₃H₇ / —CH₂OH / N↓O | ...do...... | [1] 151–153 |
| (7) O↑N—CO—NH—CH(CH₃)₂ / —CH₂OH / N↓O | ...do...... | [1] 186–187 |
| (8) O↑N—CO—NH—C₆H₅ / —CH₂OH / N↓O | ...do...... | [1] 170–171 |
| (9) O↑N—CO—NH—CH₂—CH₂OH / —CO₂H / N↓O | ...do...... | [1] 173–175 |
| (10) O↑N—CO—NH—CH₂-CH₂-OCH₃ / —CH₂OH / N↓O | ...do...... | [1] 142–145 |
| (11) O↑N—CO—NH—CH₂—C₆H₅ / —CH₂OH / N↓O | ...do.... | [1] 170–173 |
| (12) O↑N—CO-NH-CH₂-CH=CH₂ / —CH₂OH / N↓O | Yellow. | [1] 144–145 |
| (13) O↑N—CO—NH—NH₂ / —CH₂OH / N↓O | ...do...... | [1] 162–165 |

See footnote at end of table.

TABLE—Continued

| Compound | Color | Melting point, °C |
|---|---|---|
| (14) [quinoxaline di-N-oxide with -CO-NH-OH and -CH₂OH] | Orange. | [1] 156–158 |
| (15) [methyl-substituted quinoxaline di-N-oxide with -CO-N(morpholino) and -CH₂OH] | Yellow. | [1] 189–191 |
| (16) [chloro-substituted quinoxaline di-N-oxide with -CO-N(morpholino) and -CH₂OH] | ...do...... | [1] 198–199 |
| (17) [quinoxaline di-N-oxide with -CO-N(pyrrolidino) and -CH₂OH] | ...do...... | [1] 177–179 |
| (18) [quinoxaline di-N-oxide with -CO-N(N'-methylpiperazino) and -CH₂OH] | ...do...... | 125–127 |
| (19) [quinoxaline di-N-oxide with -CO-NH-CH₂-CH(OH)-CH₃ and -CH₂OH] | Whitish yellow. | 157–160 |
| (20) [quinoxaline di-N-oxide with -CO-NH-CH₂-CH₂-CH(OH)-CH₃ and -CH₂OH] | Yellow. | 149–151 |
| (21) [quinoxaline di-N-oxide with -CO-NH-CH₂-CH₂-CH₂-OH and -CH₂OH] | Beige. | 141–143 |

[1] Decomposition.

The preparation of the starting compounds is illustrated by the following:

29.1 g. (0.1 mol) of 2-acetoxymethyl-3-carboxylic acid-methylamidoquinoxaline-di-N - oxide(1,4) are introduced into 100 ml. of methanol containing 10 g. of 37% strength hydrochloric acid and the mixture is heated to 80° C. for 5 minutes. The starting product thereupon dissolves and after a short time the 1-oxo-1,3-dihydro-furo[3,4-b]quinoxaline-4,9-dioxide separates out in the form of yellow crystals which after recrystallization from dimethylformamide melt at 207° C. with decomposition. Yield: 15.5 g. (71% of theory).

The 2-acetoxymethyl-3-carboxylic acid - methylamidoquinoxaline-di-N-oxide(1,4) is obtained as follows:

26.7 g. (0.1 mol) of 2-chloromethyl-3-carboxylic acid methylamidoquinoxaline-di-N-oxide(1,4) are suspended in 100 ml. of ethanol and mixed with 16.4 g. (0.2 mol) of sodium acetate dissolved in 40 ml. of water. The mixture is heated to 70° C. for 5 hours and subsequently cooled to 0°–5° C. 17 g. (58.4% of theory) of yellow crystals of 2 - acetoxymethyl-3-carboxylic acid-methylamidoquinoxaline-di-N-oxide(1,4) precipitate, and melt at 167–169° C. after recrystallization from acetonitrile.

The other compounds employed for the present process can be obtained in an analogous manner.

As already mentioned, the compounds of the invention show chemotherapeutic activity. Their chemotherapeutic action has been tested in animal experiments (oral and subcutaneous) in the case of acute bacterial infections, and in vitro. The compounds show a very good antibacterial action in both cases, with the active range comprising both gram-negative and gram-positive bacteria. Furthermore, the compounds are active against mycoplasms in vitro. The compounds can be administered both orally and parenterally. In the case of oral use with animals, ingestion through fodder or drinking water is possible. The compounds can also serve as fodder additives in the raising of poultry or other young animals, in order to avoid diseases occurring in raising, and for better fodder utilization.

In general it has proved advantageous to administer amounts of about 5 mg. to about 300 mg. per kilogram of body weight per day in the case of acute infections in order to achieve effective results. Nevertheless it can at times be necessary to deviate from this range, depending for example on the infection pattern or the nature of the bacteria, on the body weight of the test animal or of the animal to be treated, on the nature of the administration route, on the type of animal and its individual behavior towards the medicine, on the nature of the formulation and the time or interval at which the administration takes place. Thus it may in some cases suffice to use less than the above-mentioned minimum quantity while in other cases the upper limit of the range mentioned may have to be exceeded. Where larger amounts are administered, it may be advisable to divide these into several individual administrations over the course of a day. The same dosage range is envisaged for human medicine, and because of the different metabolism conditions even lower dosages may be possible.

The new medicines can be employed either as such or in combination with pharmaceutically acceptable excipients. Possible forms of administration in combination with various inert excipients include tablets, capsules, powders, sprays, aqueous suspensions, injectable solutions, elixirs, syrups and the like. Such excipients comprise solid or liquid diluents or carriers including sterile aqueous media as well as various non-toxic organic solvents and the like. Of course the tablets and the like which are possible for oral administration can be provided with sweetening, flavoring and/or coloring agents.

The therapeutically active compound should generally be present in a concentration of about 0.5 to 90% by weight of the total mixture, in amounts which are sufficient to achieve the desired dosages.

Tablets for oral ingestion can of course contain additives such as sodium citrate, calcium carbonate and dicalcium phosphate together with various other diluents such as starch, preferably potato starch, and the like and binders, such as polyvinylpyrrolidone, gelatin and the like. Furthermore, lubricants such as magnesium stearate, sodium lauryl sulphate and talcum can be used for tablet making. In the case of aqueous suspensions and/or elixirs which are intended for oral administration, the active substance can be used together with various flavor improving agents, coloring agents, emulsifiers and/or together with diluents such as water, ethanol, propylene glycol, glycerin and similar compounds of this kind or combinations thereof.

For parenteral use, solutions of the active substances in sesame oil or groundnut oil or in aqueous propylene glycol or N,N-dimethylformamide can be employed, as can sterile aqueous solutions in the case of the water-soluble compounds.

Such aqueous solutions should, where necessary, be buffered in the usual manner, and furthermore the liquid diluent should from the start be rendered isotonic by addition of the requisite amount of salt or glucose. Such aqueous solutions are especially suitable for intravenous, intramuscular and intraperitoneal injections. The manufacture of such sterile aqueous media can be carried out in known manner.

The tabulation which follows shows the effectiveness of some of the compounds described; the numbers of the tested compounds corresponding to the numbers of the formulae given above in the examples. In the animal experiments with white mice, the intraperitoneally infected animals were treated subcutaneously or orally as follows:

(1) Single administration s.c. or p.o. of 1000 mg., 500 mg., 200 mg., 100 mg., 50 mg., 25 mg., 12.5 mg. or 6.25 mg./kg. 15 minutes before or 90 minutes after infection.

(2) Double (or triple) administration of 6.25 mg., 12.5 mg., 25 mg., 50 mg., or 150 mg./kg. two hours before and 5 hours after infection.

(3) Quadruple administration of 50 mg. or 150 mg./kg. two hours before infection, shortly before infection, 3 hours, 5 hours and/or 21 hours and 29 hours after infection.

*E. coli, Klebsiella, Staphylococcus aureaus, Diplococcus pneumoniae* or *Streptococcus pyogenes, Proteus mirabilis* and *Pseudomonas aeruginosa* were used as infection germs.

The ED$_{100}$ of the compounds which are most active against *E. coli* C 165 or *Staph. aureus* 133, for example the compounds of Formulae 1, 6, 3, 4, 7, 9, 10, 12, and 13, is between 6 mg./kg. and 300 mg./kg. for a single oral or subcutaneous administration. The LD$_{50}$ lies in the dosage range of about 400 mg./kg. to about 3000 mg./kg. after singlet oral administration to mice. The substances are thus relatively non-toxic since the relatively less tolerated substances are distinguished by higher activity and are therefore only employed at a lower dosage. The substances were also tolerated well when treating rats twice daily with 60 mg./kg. administered orally over the course of 17 days.

In the case of acute ascending infections of the urinary tract of rats with *Proteus mirabilis* (Pyelonephritides) dosages of 2×15 mg./kg. daily over the course of 7–10 days were successfully used and well tolerated. In vitro, the substances show a bacteriostatic and bactericidal action.

The invention therefore also provides a pharmaceutical composition comprising at least one of the new active compounds in admixture with a solid or liquid diluent or carrier.

The invention further provides a medicament in dosage unit form comprising at least one of the new active compounds either alone or in admixture with a solid or liquid diluent or carrier. The medicament may include a protective envelope containing the active compound and, if used, the diluent or carrier.

The term "medicament in dosage unit form" as used in the present specification means a medicament as defined above in the form of discrete portions each containing a unit dose, or a multiple or submultiple of a unit dose of the active compound or compounds. Such portions may, for example, be in monolithic coherent form, such as tablets, suppositories, pills or dragées; in wrapped or concealed form, such as wrapped powders, cachets, sachets, or capsules; in ampoules, either free or as a sterile solution suitable for parenteral injection; or in any other form known to the art.

The invention also provides animal feedstuffs comprising at least one of the new active compounds in admixture with a fodder.

What is claimed is:

1. A pharmaceutical composition comprising a solid or liquid diluent or carrier in combination with an antibacterially effective amount of a compound of the formula:

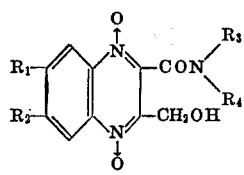

wherein each of $R_1$ and $R_2$, independent of the other, is hydrogen, lower alkyl or chloro; and each of $R_3$ and $R_4$, when taken separately and independent of the other, is hydrogen; hydroxy; amino; alkyl of 1 to 4 carbon atoms; alkyl of 1 to 4 carbon atoms substituted by hydroxy, phenyl, cyano, halogeno, amino, alkoxy of 1 to 4 carbon atoms or carbalkoxy wherein the alkoxy group is of 1 to 4 carbon atoms; cycloalkyl of 5 or 6 carbon atoms; or alkenyl of 2 to 4 carbon atoms, provided that when one of $R_3$ and $R_4$ is amino or hydroxy, the other is hydrogen; or $R_3$ and $R_4$ taken together with the nitrogen atom to which they are attached are a 5 to 7-membered saturated heterocyclic ring or such ring having as a further hetero ring member oxygen, sulfur or N-alkyl of 1 to 4 carbon atoms.

2. A composition according to claim 1 wherein in said compound, $R_1$ and $R_2$ are hydrogen and $R_3$ and $R_4$ are the same or different and are each hydrogen, methyl, n-propyl, isopropyl, β-hydroxyethyl, β-methoxyethyl, hydroxyalkyl of 1 to 4 carbon atoms or aminoalkyl of 1 to 4 carbon atoms.

3. A composition according to claim 2 wherein said compound $R_3$ is hydrogen.

4. A composition according to claim 1 comprising in dosage unit form, from 0.5 to 90% of said compound.

5. A composition according to claim 4 wherein said compound is 2-hydroxymethyl-3-N,N-dimethyl carboxylic acid amidoquinoxaline-di-N-oxide (1,4).

6. A composition according to claim 4 wherein said compound is 2-hydroxymethyl-3-carboxylic acid amidoquinoxaline-di-N-oxide (1,4).

7. A composition according to claim 4 wherein said compound is 2-hydroxymethyl-3-N-methyl carboxylic acid amidoquinoxaline-di-N-oxide (1,4).

8. A composition according to claim 4 wherein said compound is 2-hydroxymethyl-3-N-ethyl carboxylic acid amidoquinoxaline-di-N-oxide (1,4).

9. A composition according to claim 4 wherein said compound is 2-hydroxymethyl-3-N-propyl carboxylic acid amidoquinoxaline-di-N-oxide (1,4).

10. A composition according to claim 4 wherein said compound is 2-hydroxymethyl-3-N-isopropyl carboxylic acid amidoquinoxaline-di-N-oxide (1,4).

11. A composition according to claim 4 wherein said compound is 2-hydroxymethyl-3-N-cyclohexyl carboxylic acid amidoquinoxaline-di-N-oxide (1,4).

12. A composition according to claim 4 wherein said compound is 2-hydroxymethyl-3-N-(2-hydroxyethyl) carboxylic acid amidoquinoxaline-di-N-oxide (1,4).

13. A composition according to claim 4 wherein said compound is 2 - hydroxymethyl-3-N-(2-methoxyethyl) carboxylic acid amidoquinoxaline-di-N-oxide (1,4).

14. A composition according to claim 4 wherein said compound is 2-hydroxymethyl-3-N-benzyl carboxylic acid amidoquinoxaline-di-N-oxide (1,4).

15. A composition according to claim 5 wherein said compound is 2-hydroxymethyl-3-N-allyl carboxylic acid amidoquinoxaline-di-N-oxide (1,4).

16. A composition according to claim 4 wherein said compound is 2 - hydroxymethyl-3-N-(2-hydroxypropyl) carboxylic acid amidoquinoxaline-di-N-oxide (1,4).

17. A composition according to claim 4 wherein said compound is 2 - hydroxymethyl-3-N-(3-hydroxybutyl) carboxylic acid amidoquinoxaline-di-N-oxide (1,4).

18. A composition according to claim 4 wherein said compound is 2 - hydroxymethyl-3-N-(3-hydroxypropyl) carboxylic acid amidoquinoxaline-di-N-oxide (1,4).

19. A composition according to claim 4 wherein said compound is 2 - hydroxymethyl-3-morpholinocarbonyl quinoxaline-di-N-oxide (1,4).

20. A composition according to claim 4 wherein said compound is 2 - hydroxymethyl - 3 - pyrrolidinocarbonyl quinoxaline-di-N-oxide (1,4).

21. A composition according to claim 4 wherein said compound is 2 - hydroxymethyl-3-N'-methylpiperazinocarbonyl quinoxaline-di-N-oxide (1,4).

22. A composition according to claim 4 wherein said compound is 2 - hydroxymethyl-3-N-hydroxy carboxylic acid amidoquinoxaline-di-N-oxide (1,4).

23. A composition according to claim 4 wherein said compound is 2 - hydroxymethyl - 3 - hydrazinocarbonyl quinoxaline-di-N-oxide (1,4).

24. A livestock fodder in combination with an amount of a quinoxaline derivative sufficient to improve the utilization of said fodder upon consumption by livestock, said quinoxaline derivative having the formula:

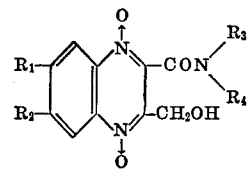

wherein each of $R_1$ and $R_2$, independent of the other, is hydrogen, lower alkyl or chloro; and each of $R_3$ and $R_4$, when taken separately and independent of the other, is hydrogen; hydroxy; amino; alkyl of 1 to 4 carbon atoms; alkyl of 1 to 4 carbon atoms substituted by hydroxy, phenyl, cyano, halogen, amino, alkoxy of 1 to 4 carbon atoms or carbalkoxy wherein the alkoxy group is of 1 to 4 carbon atoms; cycloalkyl of 5 or 6 carbon atoms; or alkenyl of 2 to 4 carbon atoms, provided that when one of $R_3$ and $R_4$ is amino or hydroxy, the other is hydrogen; or $R_3$ and $R_4$ taken together with the nitrogen atom to which they are attached are a 5 to 7-membered saturated heterocyclic ring or such ring having as a further hetero ring member oxygen, sulfur or N-alkyl of 1 to 4 carbon atoms.

References Cited

UNITED STATES PATENTS 3,663,697    5/1972    Conover _____ 424—250

SAM ROSEN, Primary Examiner

U.S. Cl. X.R.

424—246, 250